United States Patent
King et al.

(10) Patent No.: US 7,626,152 B2
(45) Date of Patent: Dec. 1, 2009

(54) BEAM DIRECTOR AND CONTROL SYSTEM FOR A HIGH ENERGY LASER WITHIN A CONFORMAL WINDOW

(75) Inventors: William B. King, Rancho Palos Verdes, CA (US); Chungte W. Chen, Irvine, CA (US); Robert W. Byren, Manhattan Beach, CA (US); Chaunchy F. McKearn, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 92 days.

(21) Appl. No.: 11/505,271

(22) Filed: Aug. 16, 2006

(65) Prior Publication Data
US 2008/0042042 A1    Feb. 21, 2008

(51) Int. Cl.
G01J 1/20 (2006.01)
(52) U.S. Cl. .................................. 250/201.9; 359/16
(58) Field of Classification Search .............. 250/201.9; 356/521; 359/16
See application file for complete search history.

(56) References Cited

U.S. PATENT DOCUMENTS

| | | | |
|---|---|---|---|
| 4,102,572 A | 7/1978 | O'meara | |
| 5,042,922 A * | 8/1991 | Pepper | 349/17 |
| 5,090,795 A | 2/1992 | O'Meara et al. | |
| 5,657,307 A * | 8/1997 | Taneya et al. | 369/116 |
| 5,694,408 A | 12/1997 | Bott et al. | |
| 5,898,501 A * | 4/1999 | Suzuki et al. | 356/511 |
| 5,912,731 A * | 6/1999 | DeLong et al. | 356/121 |
| 6,809,307 B2 | 10/2004 | Byren et al. | |

(Continued)

FOREIGN PATENT DOCUMENTS

WO    WO 2006/024911 A2    3/2006

OTHER PUBLICATIONS

Keskin O et al: "Point spread function reconstruction fro woofer-tweeter adaptive optics bench" SPIE-INT. Soc. Opt. Eng USA. vol. 6272, No. 1 Jun. 27, 2006.

(Continued)

*Primary Examiner*—Georgia Y Epps
*Assistant Examiner*—Kevin Wyatt
(74) *Attorney, Agent, or Firm*—Leonard A. Alkov

(57) ABSTRACT

A beam control system and method. The system includes an illuminator for providing a first beam of electromagnetic energy at a first wavelength; a source for providing a second beam of electromagnetic energy at a second wavelength; and an arrangement for compensating wavefront errors in the second beam using a bias representative of a comparison between the first wavelength and the second wavelength. In the illustrative embodiment, the arrangement includes a processor which corrects wavefront errors using a bias representative of a difference between said first wavelength and said second wavelength. In the disclosed application, a target wavefront sensor is included and the laser is a high-energy laser beam. The wavefront errors include a chromatic aberration and the errors are compensated using a deformable mirror and a correction algorithm executed by an adaptive optics processor. In one alternative embodiment, the errors are compensated using an optical aberration corrector. The aberration corrector may be a holographic optical element or other suitable device. In another alternative embodiment, the errors are corrected with the above embodiment in combination with the use of "woofer" and "tweeter" correcting elements with the woofer being a long stroke low frequency element and the tweeter being a short stroke high frequency element.

31 Claims, 4 Drawing Sheets

U.S. PATENT DOCUMENTS

| | | | |
|---|---|---|---|
| 6,819,491 B2 * | 11/2004 | Takahashi et al. | 359/566 |
| 2001/0036141 A1 * | 11/2001 | Kim et al. | 369/112.17 |
| 2003/0063366 A1 | 4/2003 | Hunt | |
| 2004/0086282 A1 * | 5/2004 | Graves et al. | 398/202 |
| 2004/0233823 A1 * | 11/2004 | Ohta | 369/112.26 |
| 2005/0063285 A1 * | 3/2005 | Mushika et al. | 369/112.29 |
| 2005/0174918 A1 * | 8/2005 | Ogata | 369/112.02 |
| 2006/0175528 A1 * | 8/2006 | Greenaway et al. | 250/201.9 |

OTHER PUBLICATIONS

Hampton, P. et al.: "Control of a woofer tweeter system of deformable mirrors" Advanced Software and Control for Astronomy, Proceedings of SPIE. vol. 6274, No. 62741Z.

Hampton, P. et al: "Control of aa woofer tweeter system of deformable mirrors" Advanced Software and Control for Astronomy. Proceedings of SPIE. vol. 6274, No. 62741Z.

\* cited by examiner

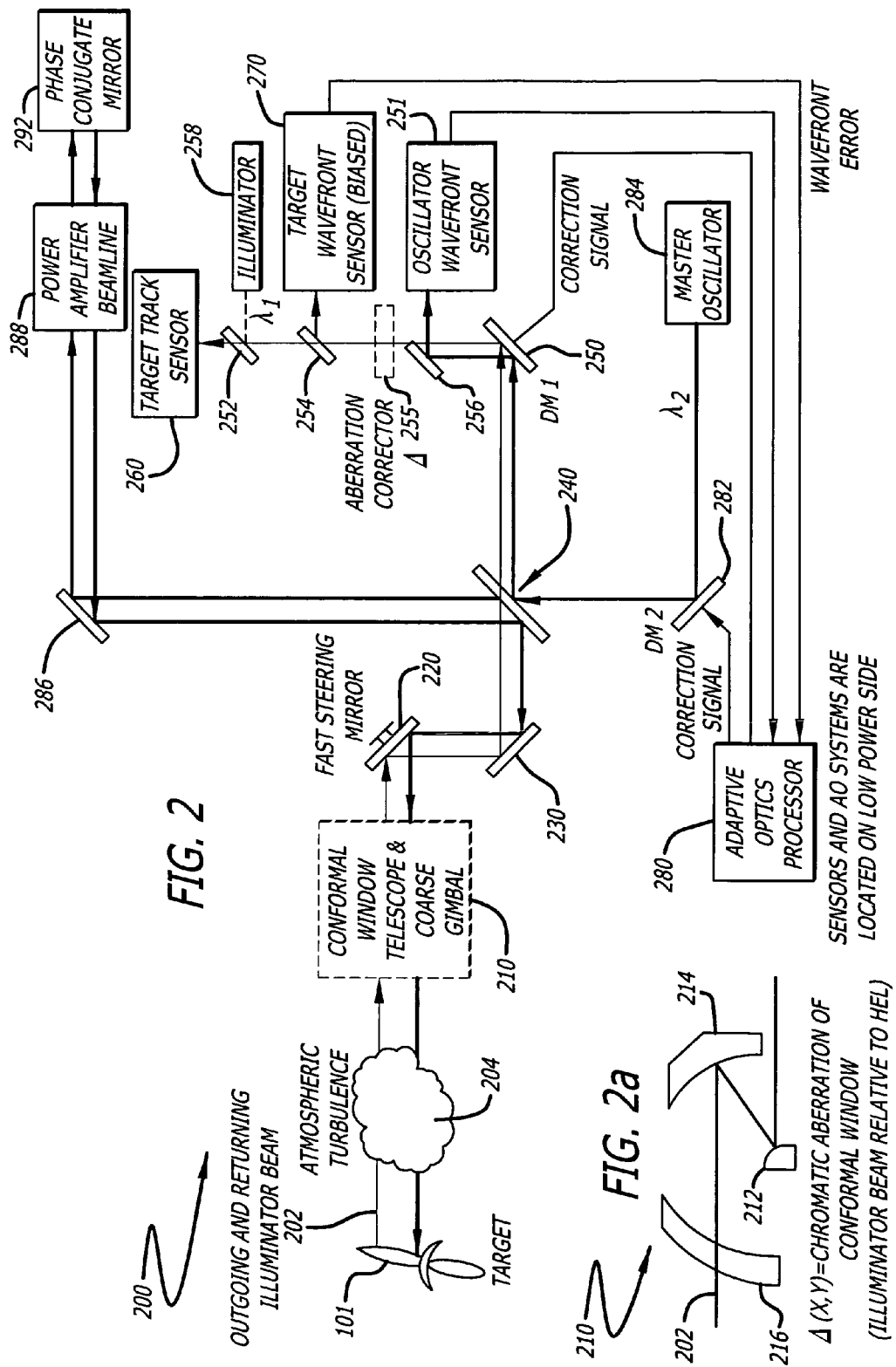

BEAM DIRECTOR AND CONTROL SYSTEM FOR A HIGH ENERGY LASER WITHIN A CONFORMAL WINDOW

BACKGROUND OF THE INVENTION

1. Field of the Invention

The present invention relates to optics. More specifically, the present invention relates to systems and methods for directing and correcting high-power beams of electromagnetic energy.

2. Description of the Related Art

Directed energy weapons and specifically high-energy laser (HEL) weapons are being considered for a plethora of military applications with respect to a variety of platforms, e.g., spaceborne, airborne and land based systems to name a few. These weapons generally involve the use of the laser or other source of a high-power beam to track and destroy a target. To achieve mission objectives, directed energy weapons must be accurately steered and optimally focused. Steering involves line-of-sight control while focusing, which with respect to HEL weapons, necessitates wavefront error correction. Currently, wavefront error correction is typically achieved using adaptive optics. The current state of the art in laser beam control adaptive optics requires placing one or more deformable mirrors within the highest intensity portion of the beam path. The conventional deformable mirror is typically a large element with a thin face sheet and a number of piezoelectric actuators. Actuators are located behind the face sheet and are electrically driven to push and pull on the surface thereof to effect the deformation required to correct wavefront errors in an outgoing beam. The size of the active region of the deformable mirror must accommodate the full size of the high power laser beam in the high power Coudé path prior to expansion via an output telescope.

In addition, one or more fast steering mirrors may be used to correct for tilt and direct the line-of-sight. A coarse gimbal may be employed to correct for line-of-sight errors as well. A plurality of wavefront sensors are typically employed along with an aperture-sharing element (ASE). The ASE allows a single shared aperture to be advantageously used for both the low power sensors and the high power output laser beam, ensuring that the path through the atmosphere taken by the high power beam is the same as that taken by the wavefront sensor and that the correction applied to the shared atmospheric path is optimal for the high-power beam.

Unfortunately, the use of delicate optical devices in the path of a high-power beam is problematic. This is due to the fact that the high-power beam will heat and distort the optical element unless the element is actively cooled or has a coating with a very low optical absorption coefficient. The most durable coatings require a high temperature application process. Deformable mirrors are typically coated after the face sheet is bonded to the actuators, which limits the maximum temperature to which the deformable mirror assembly may be exposed without degrading the bond. Therefore, coatings may need to be applied at lower than optimal temperature using more complex coating processes, thereby reducing durability and/or increasing manufacturing cost.

In addition, conventional adaptive optics systems using deformable mirrors are limited in performance. Conventional deformable mirrors systems are limited with respect to the speed at which the mirror drive signals are computed and the reaction speed of the deformable mirror mechanism to correct for aberrations. There is also a limitation with respect to the number actuators that can be used. The number of actuators that may be used determines the resolution or "order" of the mirror. The stroke of the conventional deformable mirror is limited. "Stroke" relates to the amount of mirror surface deflection that may be achieved before either the piezoelectric actuators exceed their dynamic range or the face sheet begins to fail. Further, a conventional continuous face sheet deformable mirror cannot correct for a pathology in the spatial phase pattern, such as a branch point or an abrupt phase discontinuity. A branch point is a "singularity" in a deeply scintillated phase pattern caused by atmospheric turbulence over a long propagation path in which the phase monotonically increases around a zero amplitude point like a corkscrew, thereby requiring an abrupt $2\pi$ phase correction within the spatial phase pattern. Abrupt phase discontinuities may be caused by the optical discontinuities between segments of a multi-segment primary mirror.

In U.S. Pat. No. 5,694,408, issued Dec. 2, 1997, Bott, Rice, and Zediker appear to disclose a scheme which allows the deformable element to be placed in the low intensity region between a master oscillator and an array of fiber power amplifiers. The approach is to pre-distort the phase of the oscillator beamlets after separation in a distribution network and before injection into the fiber amplifier array, such that the pre-distortion corrects both the piston error between the individual fibers and optical aberrations in the atmosphere. However, this scheme is practical only with a coherently combined array of single-mode fiber amplifiers, as each fiber channel is correctable in piston only, not high order. Also, this scheme is not applicable to multi-mode laser media such as large core fiber amplifiers or bulk media lasers as contemplated for weapon class HEL devices and may not be scaleable to high power levels due to random, high frequency phase noise caused by pump-induced temperature fluctuations within the fibers.

In U.S. Pat. No. 5,090,795, issued Feb. 25, 1992, O'Meara and Valley appear to disclose several related schemes for using a liquid crystal light valve (LCLV) in a self-correcting adaptive optics system. This approach, however, places the LCLV in the high power beam path and is therefore limited by the damage susceptibility of the liquid crystal material.

Accordingly, a need remained in the art for a fast, large-stroke, high spatial bandwidth or high order system or method for effecting wavefront correction of a high-power beam. Additionally, a need remained for a wavefront correction system or method that would operate modulo $2\pi$, i.e., accommodates an instantaneous $2\pi$ phase jump anywhere within the phase pattern.

The need was addressed by U.S. Pat. No. 6,809,307 issued Oct. 26, 2004 to Byren et al. and entitled SYSTEM AND METHOD FOR EFFECTING HIGH-POWER BEAM CONTROL WITH ADAPTIVE OPTICS IN LOW POWER BEAM PATH, hereinafter the 'Byren' patent. In the Byren patent, a beam control system and method that utilizes the wavefront reversal property of nonlinear optical phase conjugation to permit incorporation of a liquid crystal Optical Phased Array (OPA) within low power legs of the beam control system is disclosed and claimed. The heart of the cited invention is the use of deformable optical elements in the low power path of a High Energy Laser (HEL) beam control subsystem to correct for atmospheric turbulence, aero-optic effects, and HEL beam path aberrations.

The Byren patent is adapted for use within an enclosure having a flat window. Unfortunately, as is known in the art, in airborne applications, flat windows are problematic with respect to aerodynamic and optical design and operational considerations. That is, flat windows tend to be more fragile, impose considerable operational constraints on the system and are not conducive to high performance aerodynamic operation. Accordingly, several current and contemplated airborne HEL applications specify the use of spherical, or otherwise conformal, exit windows to minimize aerodynamic drag loads on a beam director turret and high order aero-optic aberrations created with flat windows. For tactical aircraft applications, the use of conformal window instead of flat window will greatly reduce the time varying aero optical disturbances of the surrounding flow field.

However, conformal windows add large-stroke, low-order phase distortions due to lensing as well as chromatic aberration effects resulting from index dispersion, and these must be compensated by the beam control system in order to generate high HEL beam intensity on target.

Hence, a need remains in the art for a system or method for a fast, large-stroke, high spatial bandwidth or high order system or method for effecting wavefront correction of a high-power beam from within a turret with a conformal window.

SUMMARY OF THE INVENTION

The need in the art is addressed by the beam control system and method of the present invention. In general, the system includes an illuminator for providing a first beam of electromagnetic energy at a first wavelength; a source for providing a second beam of electromagnetic energy at a second wavelength; and an arrangement for compensating the wavefront errors in the second beam using a bias representative of a comparison between the first wavelength and the second wavelength.

In the illustrative embodiment, the arrangement includes an adaptive optics processor which compensates the measured wavefront errors for chromatic aberration using a bias algorithm representative of a difference between the first wavelength and the second wavelength. In the disclosed application, a target wavefront sensor is included and the source is a high-energy laser beam. In one alternative embodiment, the chromatic wavefront errors are compensated using an aberration corrector optic. The aberration corrector may be a holographic optical element or other suitable device. In another alternative embodiment, the errors are corrected with the above embodiment in combination with the use of a "woofer" and "tweeter" correcting elements with the woofer being a long stroke low frequency element and the tweeter being a short stroke high frequency element.

BRIEF DESCRIPTION OF THE DRAWINGS

FIG. 2 is a block diagram of an electromagnetic energy beam control system architecture in accordance with an illustrative embodiment of the present invention.

FIG. 2a is a diagram showing partial sectional side views of the conformal window, telescope and coarse gimbal of FIG. 2.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
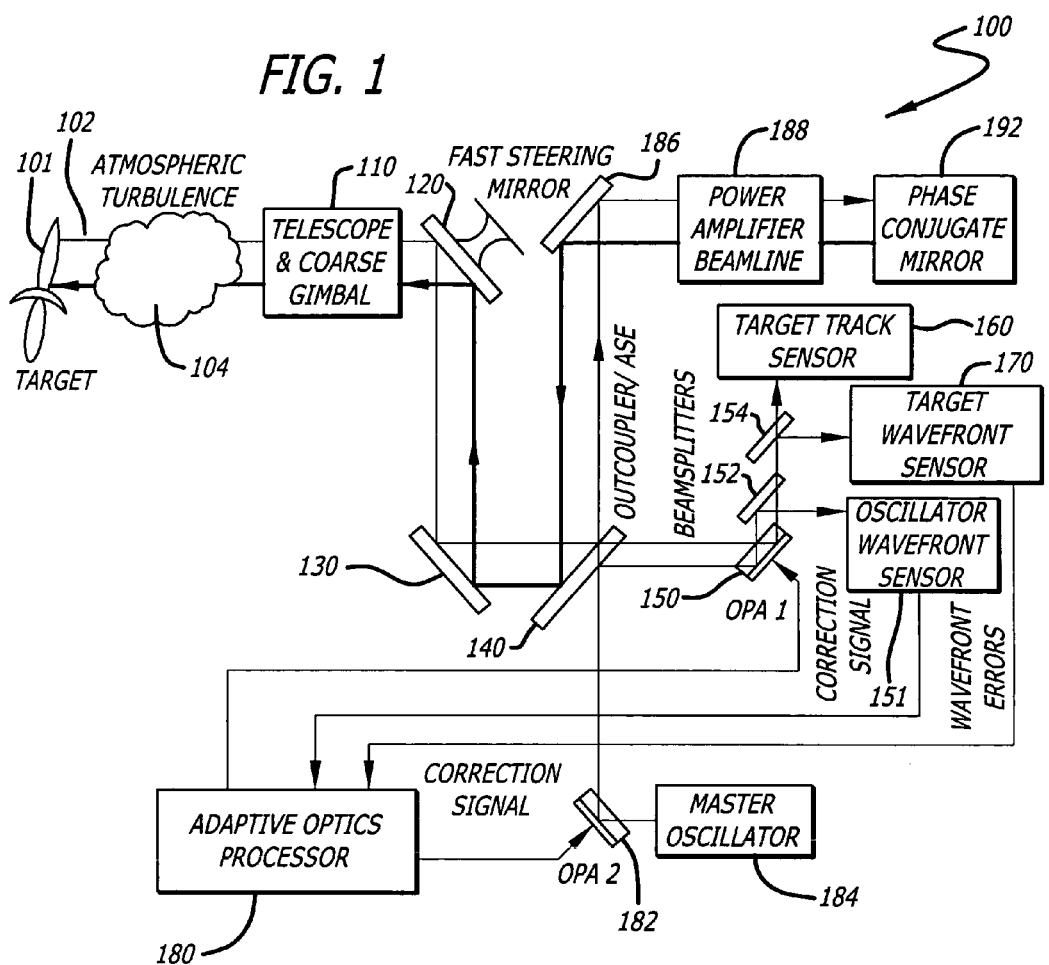
FIG. 1 is a block diagram of a high-energy, laser beam control system architecture in accordance with the teachings of U.S. Pat. No. 6,809,307.

FIG. 1 is a block diagram of a high-energy, laser beam control system architecture in accordance with the teachings of U.S. Pat. No. 6,809,307, the teachings of which are incorporated by reference herein. The heart of this system is the use of deformable optical elements, liquid crystal optical phased arrays or spatial light modulators in the low power path of a high-energy laser (HEL) beam control subsystem to correct for atmospheric turbulence, aero-optic effects, and HEL beam path aberrations. This HEL Beam Control System 100 uses Coarse Gimbals 110 in a beam director to point the beam toward the Target 101 based on an external cue. The Target Track Sensor 160 acquires the target and begins to close a track servo loop (not shown) maintaining line-of-sight to the Target 101. A Target Wavefront Sensor 170 measures the wavefront distortion along the path to the target and provides an electrical Wavefront Error signal to an Adaptive Optics Processor 180, which calculates the necessary electrical Correction Signals. Unlike the conventional system, two Correction Signals are sent to two different deformable optical elements, shown in the figure as Optical Phased Arrays (OPAs) 150 and 182. It should be appreciated that other deformable optical elements can be used, including but not limited to traditional deformable mirrors, spatial light modulators, liquid crystal light valves, and a variety of micro electromechanical systems (MEMS) without departing from the scope of the present teachings. The first OPA 150 is located in the low-power path between an Outcoupler/Aperture Sharing Element (ASE) 140 and a Beamsplitter 152, which transmits the optical signal reflected from the target 101 to a second Beamsplitter 154 and reflects a low-power sample of the optical signal from the Master Oscillator 184 to the Oscillator Wavefront Sensor 151. Beamsplitter 154 transmits a portion of the optical signal from the target to the Target Track Sensor 160 and reflects the remaining portion to the Target Wavefront Sensor 170. Laser illuminator beams, which may be used for active tracking and active wavefront sensing, are not shown. A servo loop (referred to in the art as the "target loop") is closed around OPA 1 (150), which alters the phase of the optical signal that is detected by the Target Track and Wavefront Sensors 160 and 170. For the most common "last-frame conjugation" Adaptive Optics (AO) correction scheme, the proper Correction Signal to OPA 1 (150) is that which nulls the Wavefront Error at the Target Wavefront Sensor 170 (i.e., plane-wave phasefront at Target Wavefront Sensor 170). When the servo loop is closed around OPA 1 (150), the optical aberrations along the path from the target to the Beamsplitter are corrected, and the Target Track Sensor 160 imagery is optimized for best tracking performance. Because the Target Wavefront Sensor 170 is always operated near null, the adaptive optics performance will remain good even under low signal-to-noise ratio (SNR) conditions. This is particularly important with Shack-Hartmann wavefront sensors.

The second OPA (OPA 2) 182 is located between the Master Oscillator 184 and the Outcoupler/ASE 140 in order to pre-distort the Master Oscillator beam prior to entering a power amplifier beamline 188. Typically, the power amplifier beamline consists of multiple staged laser amplifier pumpheads arranged in series to provide both the gain and efficient power extraction needed in the phase conjugate master oscillator/power amplifier architecture. A phase conjugate mirror 192 is disposed at the end of the Power Amplifier Beamline 188 and serves to reverse the direction of propagation and the wavefront of the beam from the Power Amplifier Beamline 188.

Pupil relay or re-imaging optics in the low-power beam path (not shown) may be used to relay the optical pupil located on OPA 1 (150) to the Target Wavefront Sensor 170 and OPA 2 (182) for best adaptive optics correction performance.

For the "last-frame conjugation" AO correction scheme, the proper phase correction signal for OPA 2 (182) is the complex conjugate of the correction signal applied to OPA 1 (150), properly adjusted for magnification differences between the beam paths. The plane-wave nature of the Master Oscillator 184 beam is thereby altered by OPA 2 (182) to conform to the last phasefront from the Target 101 just upstream of OPA 1 (150). Note that the signals applied to OPA 1 and OPA 2 are phase conjugates of each other for this simplified embodiment.

The pre-distorted Master Oscillator beam that is transmitted through the Outcoupler/ASE 140 is amplified in a first pass through the Power Amplifier Beamline 188, where it is further distorted due to thermal lensing and wedging and/or thermally induced stress birefringence in the amplifying laser media. The Phase Conjugate Mirror 192 acts to reverse the phasefront of this amplified beam such that the portion of the distortion caused by the first pass through the Power Amplifier Beamline 188 is corrected during a second pass through the Power Amplifier Beamline 188.

The result of double-passing the distorting Power Amplifier Beamline using a Phase Conjugate Mirror is that the phase of the high power beam emerging from the Outcoupler/ASE 140 is a phase conjugated replica of the pre-distorted Master Oscillator beam. By applying the proper pre-distortion as described above, the HEL beam will have the proper phase to correct for the Atmospheric Turbulence 104 and other optical aberrations in the common beam path from the Outcoupler/ASE 140 to the Target 101.

Non-common path errors associated with the Aperture Sharing Element (ASE) 140 arise from distortion of the optical properties of the ASE caused by non-uniform heating of the coatings and optical substrate due to finite absorption of the HEL beam power. One type of distortion is warping of the reflecting surface of the ASE, causing distortion of the reflected HEL beam phasefront. Another type of distortion is refractive in nature, resulting from thermally-induced optical path length differences across the ASE aperture. These OPD errors distort the signal from the target as it is transmitted by the Outcoupler/ASE 140 to the Target Track and Wavefront Sensors 160, 170. Note that the Target Track and Wavefront Sensor signals do not "see" the warped-surface distortion, and the HEL beam does not "see" the refractive distortion, hence the term "non-common path".

Correction for the refractive component of non-common path error in the outcoupler/Aperture Sharing Element (ASE) is accomplished as follows. A beam from a master oscillator 184 picks up refractive phasefront distortion in an outcoupler/ASE 140 as it passes vertically through the outcoupler/ASE to the front surface thereof. It then passes through the horizontal refractive distortion of the outcoupler/ASE 140 after reflection off the front surface thereof. This horizontal refractive distortion component is the same as that seen by the target signal, which is corrected by OPA 1 (150) through the action of a target loop servo within an adaptive optics processor 180. The master oscillator signal reflecting off OPA 1 (150) therefore sees only the vertical refractive distortion from the outcoupler/ASE 140.

The adaptive optics processor 180 closes a local loop servo around OPA 2 (182), which nulls the wavefront error within this master oscillator signal at the oscillator wavefront sensor 151. In so doing, a second OPA, OPA 2, (182) pre-distorts the master oscillator signal entering the outcoupler/ASE 140 with the conjugate of the vertical refractive distortion from the outcoupler/ASE element such that, when it passes vertically through the element toward the power amplifier beamline 188, this component of non-common path distortion is corrected. The amplified HEL beam that reflects off the outcoupler/ASE 140 to the target, therefore, does not contain this vertical refractive distortion component.

Correction for the warped-surface component of non-common path error in the outcoupler/ASE is accomplished as follows. The master oscillator 184 beam sample picks up the warped-surface phasefront distortion after back reflecting off the front surface of the outcoupler/ASE 140. The local loop servo acts to null the wavefront error at the oscillator wavefront sensor 151, causing OPA 2 (182) to pre-distort the master oscillator beam with the conjugate of the warped-surface distortion from the outcoupler/ASE 140. This predistorted master oscillator beam is also transmitted to the power amplifier beamline 188 and phase conjugate mirror 192 where it is amplified and conjugated.

Thus far, two phase conjugation processes have occurred, which produce an amplified HEL beam 193 that contains an unconjugated component of the warped-surface distortion sensed earlier by the sampled oscillator beam from a back reflection off the front surface of the outcoupler ASE 140. When this component is front-reflected off this front surface, it corrects the warped-surface distortion from the back reflection. The amplified HEL beam that is transmitted to the target, therefore, does not contain this warped-surface component.

Note that the phasefront distortion due to a back reflection off a surface is the phase conjugate of the phasefront distortion from a front reflection off the same surface. The process of pre-distorting a beam with the conjugate of the back reflection distortion, further conjugating that beam, and front-reflecting it off the same surface has the effect of removing the original distortion from the outgoing beam.

The adaptive optics processor 180 may also compute the correct pre-distortion signal using either deterministic or stochastic estimation techniques known in the art, which may be designed to counteract latency in the sensed wavefronts (feed forward), offsets between the location of the wavefront sensing illumination beacon on the target and the desired aimpoint, and other effects.

Pupil relay or reimaging optics in the low-power beam path (not shown) may be used to relay the optical pupil located on OPA 1 (150) to the target wavefront sensor 170, the oscillator wavefront sensor 151, and OPA 2 (182) for best adaptive optics correction performance.

In any event, as noted above, several airborne HEL applications require the use of spherical or otherwise conformal exit windows to minimize the aerodynamic drag loads on the beam director turret and high order aero-optic aberrations created with flat windows. For tactical aircraft applications, the use of conformal window instead of flat window offers the potential to significantly reduce time varying aero optical disturbances of a surrounding flow field.

However, as is known in the art, a conformal window may add large-stroke, low-order phase distortions due to lensing as well as chromatic aberration effects resulting from index dispersion. These must be corrected in order to generate a high HEL beam intensity on target.

Hence, the efficacy of conventional systems, such as those illustrated by the system of FIG. 1, may be limited if a conformal window is implemented in the system, inasmuch such systems are adapted for use with a flat window or no window at all. That is, conformal windows introduce chromatic aberration effects, which are not generally addressed by conventional systems. The present teachings address this limitation.

FIG. 2 is a block diagram of a high-energy, laser beam control system architecture in accordance with an illustrative embodiment of the present invention. The system 200 of the present invention is similar to the system 100 of FIG. 1 except that the target track and wavefront sensors 260 and 270 are modified as discussed more fully below, an aberration corrector 255 and an illuminator 258 are included, and the telescope and coarse gimbal 110 of FIG. 1 is replaced with a conformal window, telescope and coarse gimbal 210 as discussed more fully below. For the purpose of this application, the conformal window is a refractive element (which may be fabricated in fused silica or other suitable optical material) with uncorrected chromatic aberration.

In accordance with the present teachings, an illuminator laser beam (of wavelength $\lambda_1$) is transmitted from a conventional illuminator 258 through the beam control system to the target where it is reflected back toward the beam director, sampling the optical aberrations due to atmospheric turbulence, the air-flow boundary layer surrounding the beam director turret, the conformal window, the beam director telescope, and the other elements in the beam control system. The illuminator 258 may be implemented with a Q-switched Er-YAG laser operating at 1.64 μm as supplied by Raytheon Company. The illuminator beam 258 is reflected by a first beamsplitter 252 and transmitted by a second beamsplitter 254, the aberration corrector 255 and a third beamsplitter 256 to a first deformable mirror (DM 1) 250. The illuminator beam is transmitted through an outcoupler/ASE 240 to the conformal window, telescope and coarse gimbal assembly (beam director) 210 via a fold mirror 230 and fast steering mirror 220. The illuminator optical path may use polarization as a means to efficiently separate the transmitted beam from the target return using additional polarization sensitive elements not shown.

FIG. 2a is a diagram showing partial sectional side views of the conformal window, telescope and coarse gimbal 210 of FIG. 2. The conformal window is mounted within a turret (not shown). As shown in FIG. 2a, the beam director 210 includes a beam expander 211 including a primary element 212 and a secondary element 214. In accordance with the present teachings, the primary element 212 is a mirrored surface having a concave shape. The secondary element 214 is a mirrored surface having a convex shape.

Figure 3:
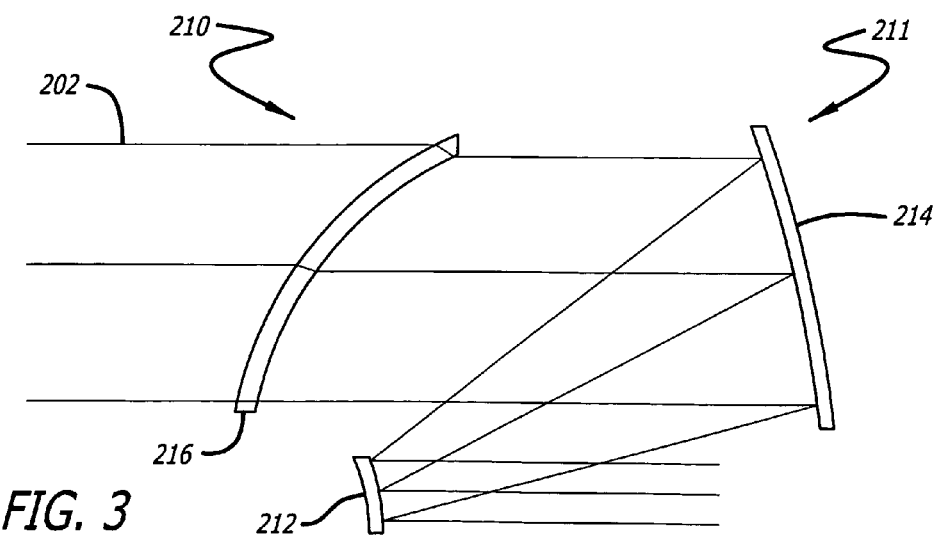
FIG. 3 shows the optical schematic of an HEL beam director constructed according to the teachings of this invention.

FIG. 3 is an optical schematic of an HEL beam director constructed according to the teachings of this invention. The beam 202 is expanded by the primary and second elements 212 and 214 and passes through the conformal window 216 toward the target 101. In the illustrative embodiment, the telescope is a Mersenne form and the window has generalized aspheric surfaces on both sides. Note in this application, if the HEL beam 202 is unobscured, then the preferred optical configuration of both the telescope and the conformal window will be off-aperture.

On return from the target 101, the illuminator beam 202 picks up a distortion from Conformal Window 216, is demagnified by the telescope 212/214, and propagates through the outcoupler/ASE toward the deformable mirror (DM 1) 250. The illuminator return beam from DM 1 is then sensed by the target wavefront sensor 270, which measures the resultant wavefront errors of the beam.

As discussed in the referenced Byren patent, the target wavefront sensor 270 is operated on-null for best performance. An adaptive optics processor 280 uses the wavefront error from the target wavefront sensor 270 to close a loop around DM 1, which nulls the wavefront error at the target wavefront sensor 270. The first deformable mirror (DM 1) 250 generates the conjugate of the resultant wavefront error of the illuminator return beam.

Note that, since the illuminator beam (at wavelength $\lambda_1$) returning from the target has transmitted through the conformal window and the ASE (both of which are refractive elements), the wavefront error generated by DM 1 is therefore wavelength dependent, and is correct only for the wavelength $\lambda_1$, which is the wavelength sensed by the target wavefront sensor 270.

As disclosed in the referenced Byren patent, both the target and local loop servos act together to null the wavefront error at the oscillator wavefront sensor 251, causing a second wavefront control element (DM 2) 282 to pre-distort the master oscillator beam (wavelength $\lambda_2$) from the master oscillator 284 with the conjugate of DM 1. Conventionally, this pre-distorted master oscillator beam is transmitted through the outcoupler/ASE 240 to the power amplifier beamline 288 and the phase conjugate mirror 292 where it is amplified and conjugated. However, there is a fundamental problem here inasmuch as a refractive (i.e. conformal) window 216 is present in the beamline. This amplified HEL beam will not have the correct conjugated wavefront error corresponding to its wavelength $\lambda_2$, since the original wavefront error generated by DM 1 was derived for the returning beam wavelength $\lambda_1$.

An objective of the present invention is to solve this problem. In accordance with the present teachings, the solution is to apply a bias, Δ, to the target wavefront sensor 270. This bias is designed specifically to compensate for the chromatic difference between the wavefront errors for $\lambda_1$ and $\lambda_2$.

After this bias Δ is applied, the target wavefront sensor 270 will sense the wavefront error of the returning illuminator beam as if its wavelength were $\lambda_2$. When the biased target wavefront sensor is nulled, DM 1 will have the desired conjugate wavefront error corresponding to that of the HEL at wavelength $\lambda_2$. The bias can either be applied in real-time to the target wavefront sensor 270 electronically through control algorithm executed by the adaptive optics processor 280 or physically as an optional aberration corrector or compensator 255. As is common in the art, the angular rotation of the compensator due to the gimbal rotation will be sensed by a gimbal position sensor (not shown). In both cases, the algorithm modifies the sensed wavefront error by the bias Δ in the wavefront adaptive optics processor 280.

There are two basic approaches to implement the correction for the chromatic aberration Δ(x,y) of the conformal window:

One approach, described below via illustrative Methods A and B with respect to FIG. 2, requires modifications involving an aberration compensator and/or a bias to be applied to the Target Wavefront Sensor in the Target Loop.

The second approach, discussed below as illustrative Methods C and D with respect to FIG. 5, requires similar modifications. However, in this case, the modifications are applied only to the Oscillator Wavefront Sensor in the local loop. Illustrative implementations in accordance with each of these approaches are described more fully below.

First, however, a definition of wavefront aberrations as a function of aperture coordinates (x,y) is provided. For this purpose, assume that:

$\Delta(x, y)$ = chromatic aberration of conformal window
$= W_{\lambda 1} - W_{\lambda 2}$ $W_{\lambda 1} = W_{\lambda 1}(x, y)$
= conformal window aberration of illuminator beam at $\lambda_1$ $W_{\lambda 2} = W_{\lambda 2}(x, y)$
= conformal window aberration of HEL beam at $\lambda_2$ and $\Phi = \Phi(x, y)$
= external aberrations(turbulence effects).

$W_{\lambda 1}$ and $W_{\lambda 2}$ are derived either by measurements or ray tracing. $\Delta(x,y)$ can be defined by the well-known Zernike Aberration Polynomial. $\Phi(x,y)$ is also wavelength dependent; however, the chromatic aberration caused by atmospheric dispersion are not corrected by the present invention, and $\Phi(x,y)$ is treated herein as a constant over wavelength. The wavefront aberration of the illuminator beam, after returning from the target and passing through conformal window is:

Illuminator Beam Aberration=$\Phi + W_{\lambda 1}$  [1]

The Adaptive Optics Processor uses the wavefront error from the Target Wavefront Sensor to close a loop around DM 1. DM 1 therefore generates the conjugate of the wavefront aberration of the illuminator return beam.

$DM1 = -(\Phi + W_{\lambda 1})$  [2]

Method A: Correction of Chromatic Aberration $\Delta(x,y)$ Using Electronic Bias of Target Wavefront Sensor This method is based on the application of a bias to the null-reference position of the Target Wavefront Sensor. This bias can be applied electronically through the AO Control Algorithm, with the magnitude of the bias setting corresponding to that of the chromatic aberration $\Delta(x,y)$.

FIG. 2 shows a Biased Target Wavefront Sensor setup. For this method for correcting the aberration, the aberration corrector optic 255 is ignored. When the Target Wavefront Sensor error data is biased with $\Delta$, the Target Loop will add this bias to the wavefront error data and close the loop around DM 1 to null this biased wavefront error. The bias $\Delta$ will modify the previously derived DM 1 correction signal in Equation [2], and the resulting DM 1 correction will be:

$DM1 = -(\Phi + W_{\lambda 1}) + \Delta$  [3]
$= -(\Phi + W_{\lambda 1}) + W_{\lambda 1} - W_{\lambda 2}$
$= -(\Phi + W_{\lambda 2})$ DM 1 will thus have the desired conjugate wavefront error corresponding to that of the HEL at wavelength $\lambda_2$, even though the illuminator beam at $\lambda_1$ is being sensed. For Method A, the Target Wavefront Sensor 270 is operated off-null, which is undesirable for a Shack-Hartmann configuration when used at a low signal-to-noise ratio.

In a beam control system, the rotation of a telescope turret gimbal will result in a deterministic rotation of the optical beam footprint on the conformal window. The exact orientation of the x- and y-axes for the $\Delta(x,y)$ aberration map, corresponding to any given gimbal rotation, can be derived by straightforward optical analysis available in the art and should be applied to the $\Delta(x,y)$ implementation. Thus, for the wavefront sensor, the required angular transformation of $\Delta(x,y)$ can be implemented electronically through the sensor control algorithm.

Method B: Correction of Chromatic Aberration $\Delta(x,y)$ by Using Aberration Corrector in the Target Loop This method is implemented by using an aberration corrector optic in the form of a holographic lens element in the sensor optics beam path of the Target Loop. The aberration corrector is designed to produce an aberration corresponding to the negative of $\Delta(x,y)$.

FIG. 2 shows an Aberration Corrector 255 in the form of a holographic lens element in the sensor optics beam path. For this approach, the Target Wavefront Sensor data is not electronically biased. The aberration corrector is designed to produce an aberration corresponding to the negative of $\Delta(x,y)$.

When the Target Loop nulls the wavefront sensor by closing the loop around DM 1, the aberration compensator will modify the previously derived DM 1 correction signal in Equation [2]. The aberration corrector will cause the DM 1 correction to be increased by $\Delta(x,y)$. The resultant effect upon DM 1 is the same as that being applied to Equation [3], namely:

$DM1 = -(\Phi + W_{\lambda 1}) + \Delta$  [4]
$= -(\Phi + W_{\lambda 1}) + W_{\lambda 1} - W_{\lambda 2}$
$= -(\Phi + W_{\lambda 2})$ For both methods A and B, the target and local loop servos act together to null the wavefront error at the Oscillator Wavefront Sensor, causing a second wavefront control element DM 2 to pre-distort the Master Oscillator beam with the conjugate of the DM 1 correction. The Master Oscillator Beam has the same wavelength $\lambda_2$ as the HEL. The DM 1 correction is given by Equation [3].

$DM2 = $ conjugate of $DM1$  [5]
$= (\Phi + W_{\lambda 2})$

The pre-distorted Master Oscillator beam, after reflecting off DM 2, is transmitted through the Outcoupler/ASE to the Power Amplifier Beamline and the Phase Conjugate Mirror where it is amplified and conjugated (see FIG. 2). This amplified HEL beam now has the correct conjugated wavefront error corresponding to its wavelength $\lambda_2$.

The wavefront aberration of this outgoing HEL Beam, after reflecting off the Outcoupler, is:

$$W_{output} = \text{conjugate of } DM2 \qquad [6]$$
$$= -(\Phi + W_{\lambda 2})$$

The Conformal Window Aberration of HEL beam at $\lambda_2$, i.e., $W_{\lambda 2}$, and the External Aberrations, $\Phi$, will be fully compensated by this outgoing HEL beam on its way to the target. That is, the resultant HEL Beam wavefront error at the target will be equal to $W_{output}+\Phi+W_{\lambda 2}=-(\Phi+W_{\lambda 2})+\Phi+W_{\lambda 2}$ which, of course is equal to zero.

It should be noted that when the gimbal turret rotates, the aberration corrector should also be physically rotated so that the aberration function $\Delta(x,y)$ will be correctly mapped onto the conformal window. This will ensure that the aberration compensation of optical beams for the Target Tracker, Illuminator and the Target Wavefront Sensor will work correctly for all gimbal rotations. Returning to FIG. 2, the corrector 255 is controlled by the adaptive optics processor 280 via an actuator (included in the corrector but not shown in FIG. 2). The corrector may also be mounted on a de-rotation drive to compensate for gimbal rotation.

A holographic lens or optical element may be used as the aberration corrector 255. The aberration corrector can be either a lens group or a holographic lens element. Such an aberration corrector can be designed and manufactured to have the precise optical aberrations corresponding to a defined Zernike Aberration Polynomial $\Delta(x,y)$. After the conformal window is designed, the optical prescription of the window will be known and by ray tracing through the window, the aberration function $\Delta(x,y)$ can be determined as a function of the aperture coordinates of the window. For a given system design, the chromatic wavefront aberration function $\Delta$ will typically be a measurable two-dimensional array of constants resulting from the transmission of the two beams through the conformal window.

Figure 4:
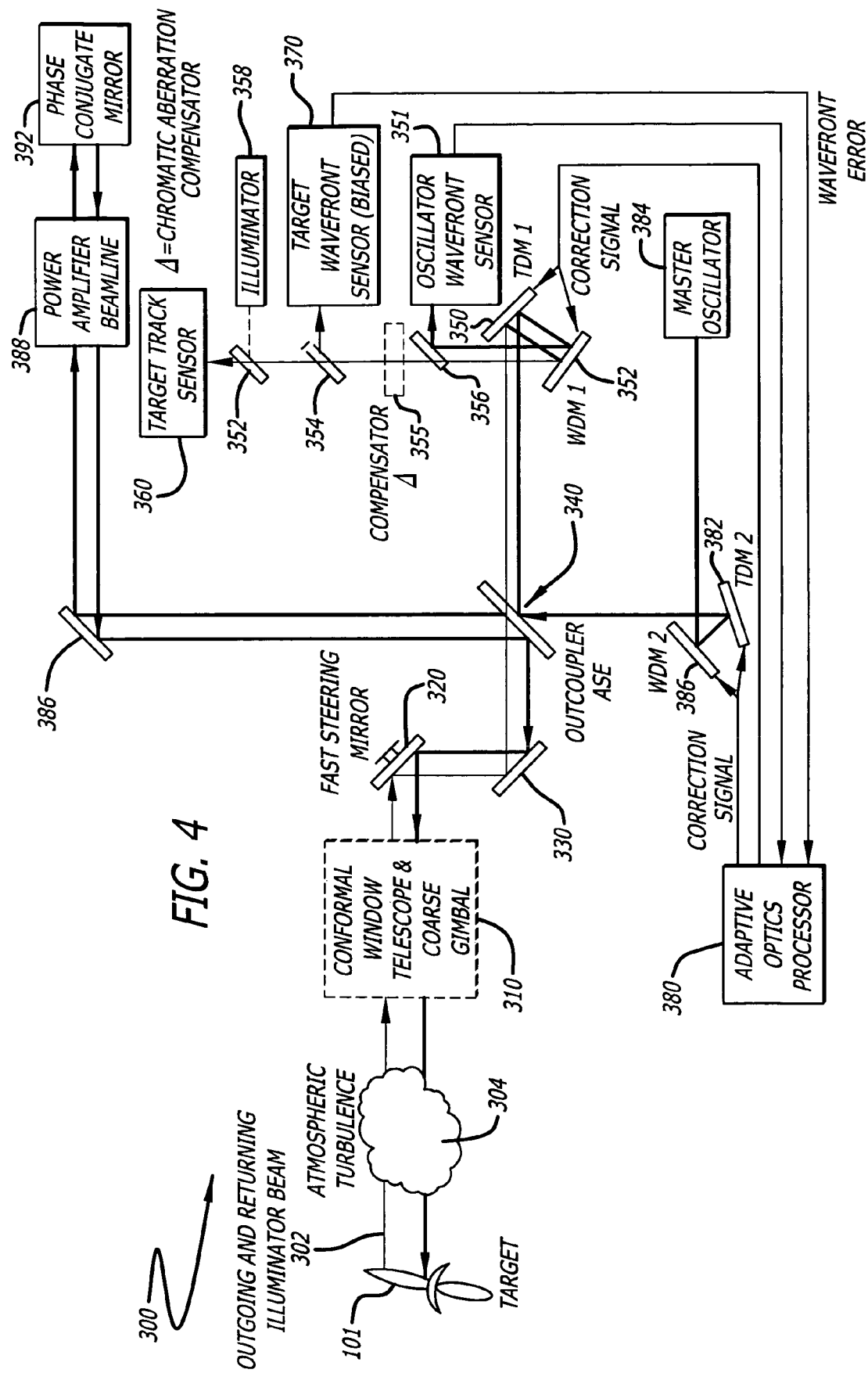
FIG. 4 is a block diagram of an electromagnetic energy beam control system architecture in accordance with an alternative embodiment of the present invention.

In order to improve the temporal response and dynamic range of the deformable mirrors DM 1 and DM 2, an alternative embodiment of the Beam Control System is shown in FIG. 4.

FIG. 4 is a block diagram of a high-energy, laser beam control system architecture in accordance with an alternative embodiment of the present invention. In this embodiment, DM 1 and DM 2 of FIG. 2 are replaced by a pair of woofer/tweeter deformable mirrors. That is, DM 1 in FIG. 2 is replaced by WDM 1 (woofer) 352 and TDM 1 (tweeter) 350, as shown in FIG. 4. Likewise, DM 2 is replaced by TDM 2 382 and WDM 2 386.

In the referenced U.S. Pat. No. 6,808,307 above, the aberrations were assumed to be such that a single wavefront control element (OPA 1) is designed to handle all the aberrations. In this new woofer-tweeter configuration, the woofer deformable mirrors, WDM 1 and 2, handle the long-stroke, low frequency, low-order aberrations; and the tweeter deformable mirrors, TDM 1 and 2, handle the shorter stroke, high frequency, high order aberrations.

Method C: Correction of Chromatic Aberration $\Delta(x,y)$ by Using an Aberration Corrector in front of the Oscillator Wavefront Sensor In the illustrative embodiment, this method is implemented by using an aberration corrector 455 in the form of a holographic lens element in front of the Oscillator Wavefront Sensor 451. This is illustrated in FIG. 5.

Figure 5:
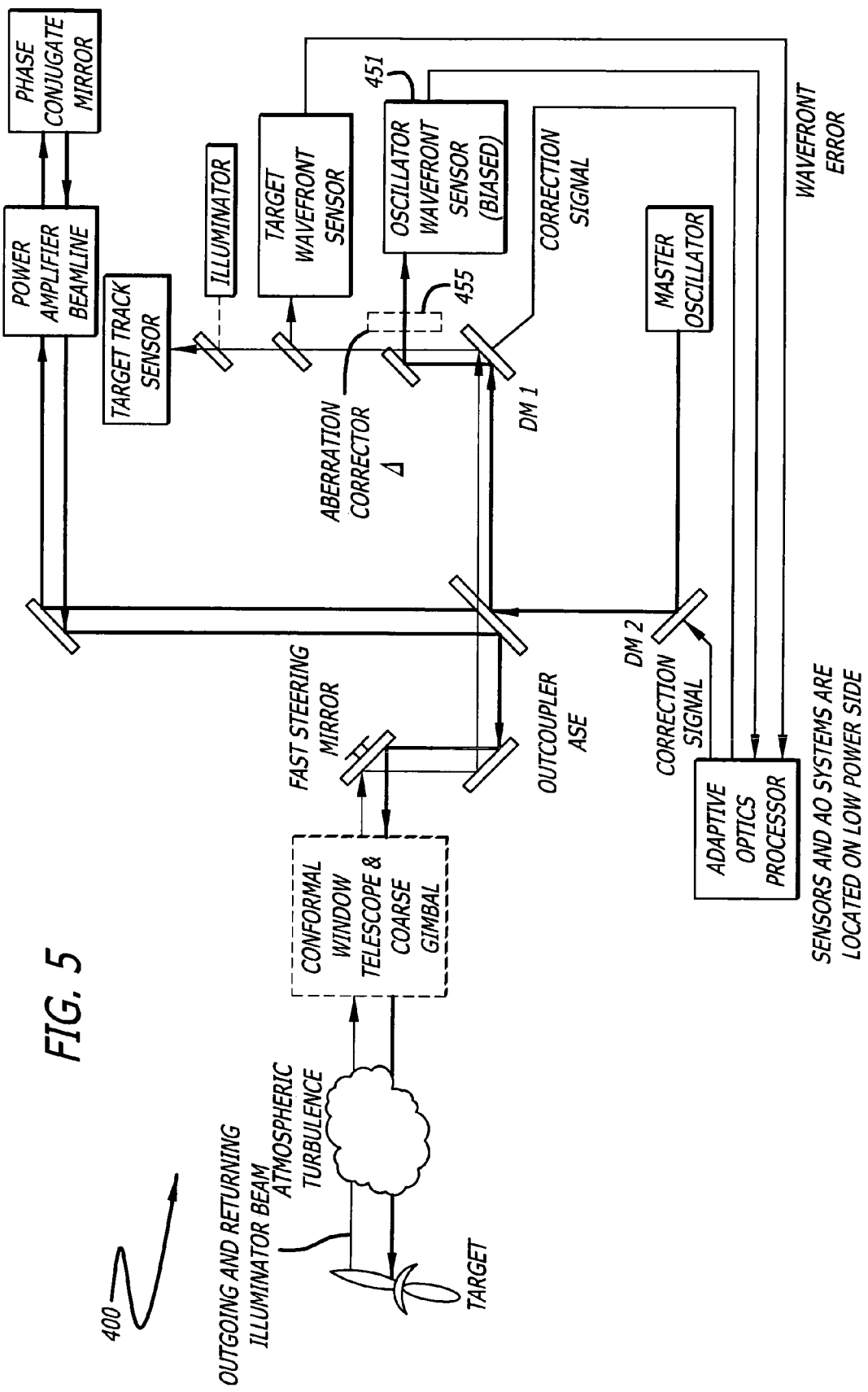
FIG. 5 is a block diagram of an electromagnetic energy beam control system architecture in accordance with a second alternative embodiment of the present invention.

FIG. 5 shows an Aberration Corrector A in the form of a holographic lens element in front of the Oscillator Wavefront Sensor. The corrector 455 is designed to produce an aberration corresponding to $\Delta(x,y)$. For this method, no bias is applied to the Oscillator Wavefront Sensor 451.

With the aberration corrector $\Delta(x,y)$ in place, the Target and Local Loop servos act together to null the wavefront error at the Oscillator Wavefront Sensor, causing wavefront control element DM2 to pre-distort the Master Oscillator beam with the conjugate of the DM1 correction and the negative $\Delta(x,y)$. The DM1 correction is given by Equation [2]. The resulting DM2 correction is:

$$DM2 = \text{conjugate of } DM1 - \Delta(x,y) \qquad [7]$$
$$= (\Phi + W_{\lambda 1}) - (W_{\lambda 1} - W_{\lambda 2})$$
$$= (\Phi + W_{\lambda 2})$$

Since Equation [7] is similar to Equation [5], the end result for Method C here is equivalent to that of Methods A and B for the chromatic aberration correction of the conformal window.

Method D: Correction of Chromatic Aberration $\Delta(x,y)$ by Using Electronic Bias for Oscillator Wavefront Sensor FIG. 5 depicts a biased Oscillator Wavefront Sensor setup. For Method D, the Aberration Corrector 455 is ignored. Instead, in accordance with this approach, the Oscillator Wavefront Sensor 451 is biased with a negative $\Delta(x,y)$, and the Target and Local Loop servos will act together to null the wavefront error at the Oscillator Wavefront Sensor, causing DM2 to pre-distort the Master Oscillator beam with the conjugate of the DM1 correction and the negative $\Delta(x,y)$. The DM1 setting is given by Equation [2]. The resulting DM2 correction will be:

$$DM2 = \text{conjugate of } DM1 - \Delta(x,y) \qquad [8]$$
$$= (\Phi + W_{\lambda 1}) - (W_{\lambda 1} - W_{\lambda 2})$$
$$= (\Phi + W_{\lambda 2})$$

Since Equation [8] is similar to Equations [5] and [7], the end result for Method D here is exactly equivalent to that of Methods A, B and C for the chromatic aberration correction of conformal window. While the Oscillator Wavefront Sensor is operated off-null, the signal-to-noise ratio may be high such that the performance of the sensor is not adversely affected, as in Method A.

Returning to FIG. 2, the resultant wavefront error of the returning illuminator beam (wavelength $\lambda_1$) as sensed by the target wavefront sensor encompasses effects associated with the external atmospheric turbulent medium, aero-optical wavefront errors around the turret window, the conformal window, the off-axis telescope, the relay and steering mirrors, and the outcoupler/ASE. As discussed above, the additional application of the bias $\Delta$ to the target wavefront sensor allows DM 1 to compensate for the relative chromatic wavefront error, with the consequence that DM 1 will have the desired conjugate wavefront error corresponding to that of the HEL wavelength $\lambda_2$.

Hence, the present invention provides an optical system adapted to function through a non-flat window and include a telescope, an illuminating beam device, a high power beam device, at least one wavefront sensor, two wavefront control devices, a chromatic wavefront null device, a master oscillator and an adaptive optics processor. The window may have surfaces that are concentric spheres one or more surfaces that are aspheric or non-concentric.

In the illustrative embodiment the illuminating beam device may be a laser beam however the invention is not limited thereto. The high-power beam device is implemented in the illustrative embodiment with a nonlinear phase conjugate mirror although the device is not limited thereto. The wavefront sensor may be implemented as a Shack-Hartmann sensor, lateral shearing interferometer or other suitable device to sense wavefront slope error.

In the illustrative embodiment, the control elements include at least one deformable mirror. As disclosed herein, the wavefront control elements may include a low frequency, long stroke, coarse actuator deformable mirror (woofer DM) and a high frequency, short stroke, high-density actuator deformable mirror (tweeter DM). The chromatic wavefront null device may be implemented with a computer-generated hologram or a biased wavefront sensor. The chromatic wavefront corrector device may be a deformable mirror or a refractive optical system which may be mounted on a de-rotation mechanism.

The chromatic wavefront error $\Delta$ between wavelengths $\lambda_1$ and $\lambda_2$ can be compensated by the corrector device by using $\Delta$ as the bias, which can be electronically applied to the wavefront sensor of $\lambda_1$. When combined with an adaptive optics controlled deformable mirror, and when the biased wavefront sensor is nulled, the deformable mirror will correct $\Delta$ for $\lambda_2$. The chromatic wavefront null device operates in conjunction with a deformable mirror controlled by the adaptive optics processor. Thus, if the window introduces $\Delta$, the effect of $\Delta$ on the outgoing illuminator beam ($\lambda_1$) transmitting through the window can be compensated for by the chromatic wavefront null device.

The effect of $\Delta$ on the target track sensor can be compensated for by the chromatic wavefront corrector device after the returning illuminator beam ($\lambda_1$) transmits through the window.

The deformable mirrors correct the resultant wavefront errors of the returning illuminator beam ($\lambda_1$) from the target, but with aid of the chromatic wavefront null device, the deformable mirrors will correct for the resultant wavefront errors corresponding to the second wavelength $\lambda_2$.

For the HEL system designs in which the conformal window is mounted on the outer gimbals and the telescope is mounted on the inner gimbals, the window and the telescope are required to be individually well corrected.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A beam control system comprising:
   first means for providing a first beam of electromagnetic energy at a first wavelength;
   second means for providing a second beam of electromagnetic energy at a second wavelength, said second beam being a high energy laser beam; and
   third means including means for detecting wavefront error in said first beam or said second beam and means for compensating wavefront errors in one of said beams using a bias designed to compensate for any chromatic difference between wavefront error in said first beam and wavefront error in said second beam.

2. The invention of claim 1 wherein said first means is an illuminator.

3. The invention of claim 2 wherein said illuminator is a laser.

4. The invention of claim 1 wherein said third means includes a target wavefront sensor.

5. The invention of claim 4 further including means for compensating for chromatic aberration using electronic bias of said target wavefront sensor.

6. The invention of claim 1 further including means for compensating for chromatic aberration using an aberration corrector.

7. The invention of claim 6 wherein said system includes a target loop.

8. The invention of claim 7 wherein said aberration compensator is disposed in said target loop.

9. The invention of claim 6 wherein said system includes an oscillator wavefront sensor.

10. The invention of claim 9 wherein said aberration corrector is disposed in front of said oscillator wavefront sensor.

11. The invention of claim 9 further including means for correcting chromatic aberration using electronic bias of said oscillator wavefront sensor.

12. The invention of claim 1 wherein said errors are compensated using an algorithm adapted for execution by a processor.

13. The invention of claim 12 wherein said processor is an adaptive optics processor.

14. The invention of claim 1 wherein said errors are compensated using an optical aberration corrector.

15. The invention of claim 14 wherein said aberration corrector is a holographic optical element.

16. The invention of claim 1 wherein said third means includes a deformable mirror.

17. The invention of claim 16 wherein said third means includes a woofer.

18. The invention of claim 16 wherein said third means includes a tweeter.

19. A beam control system comprising:
   an illuminator for providing a first beam of electromagnetic energy at a first wavelength;
   a laser for providing a second beam of electromagnetic energy at a second wavelength, said second beam being a high energy laser beam;
   a wavefront error detector for detecting wavefront errors in said first or said second beam;
   a processor for effecting compensation of wavefront errors detected in said second beam by said wavefront error detector by generating a bias signal that is generated by said processor to compensate for any chromatic difference between wavefront error in said first beam and wavefront error in said second beam; and
   a wavefront error compensator adapted to compensate for compensate for wavefront errors in one of said beams using said bias signal calculated by said processor.

20. The invention of claim 19 wherein said laser is a high-energy laser beam.

21. The invention of claim 19 further including a target wavefront sensor.

22. The invention of claim 19 wherein said errors are corrected using a correction algorithm adapted for execution by a processor.

23. The invention of claim 22 wherein said processor is an adaptive optics processor.

24. The invention of claim 19 wherein said errors are compensated using an optical aberration corrector under control of said processor.

25. The invention of claim 24 wherein said aberration corrector is holographic optical element.

26. The invention of claim 19 further including a deformable mirror.

27. The invention of claim 26 further including a first tweeter.

28. The invention of claim 27 further including a second tweeter.

29. The invention of claim 26 further including a first woofer.

30. The invention of claim 29 further including a second woofer.

31. A beam control method including the steps of:

providing a first beam of electromagnetic energy at a first wavelength;

providing a second beam of electromagnetic energy at a second wavelength, said second beam being a high energy laser beam;

detecting wavefront error in said first beam or said second beam; and compensating wavefront errors in one of said beams using a bias designed to compensate for any chromatic difference between wavefront error in said first beam and wavefront error in said second beam.

* * * * *